United States Patent [19]

Mochizuki

[11] Patent Number: 5,721,812
[45] Date of Patent: Feb. 24, 1998

[54] CHARACTER DATA PROCESSING METHOD AND APPARATUS

[75] Inventor: Yasushi Mochizuki, Zushi, Japan

[73] Assignee: Canon Kabushiki Kaisha, Tokyo, Japan

[21] Appl. No.: 621,979

[22] Filed: Mar. 26, 1996

[30] Foreign Application Priority Data

Mar. 28, 1995 [JP] Japan .......................... 069388

[51] Int. Cl.$^6$ ...................................... G06F 3/12
[52] U.S. Cl. ...................... 395/110; 395/898; 395/167
[58] Field of Search ........................ 395/110, 167–172, 395/898, 805; 345/192–195

[56] References Cited

U.S. PATENT DOCUMENTS

| | | | |
|---|---|---|---|
| 5,313,231 | 5/1994 | Yin et al. | 345/199 |
| 5,475,807 | 12/1995 | Yoshida et al. | 395/150 |
| 5,524,265 | 6/1996 | Balmer et al. | 395/800 |

*Primary Examiner*—William M. Treat
*Attorney, Agent, or Firm*—Fitzpatrick, Cella, Harper & Scinto

[57] ABSTRACT

A character-data processing method and apparatus enabling registration of font data generated by an external device into an output device even if the data format created by the external device is different from that of the output device. When font data generated by a host computer is sent to a printer, whether or not a 4-byte font identification flag of the font data is effective is judged. If effective, the font data is registered as an effective external character font. If not effective, the endian of the data is converted by rearranging the order of byte-array of the identification flag, and whether or not the font is effective is judged. If effective, the font data is registered while performing endian conversion by rearranging the order of byte-array of font data itself. Thus, difference of endians between the host computer and the printer is offsetted. Regarding bitmap font data, endian conversion is performed such that the MSB side bit and the LSB side bit are exchanged. Thus, in a case where the endians of the host computer and the printer are different, the font data generated by the host computer can be used by the printer.

20 Claims, 9 Drawing Sheets

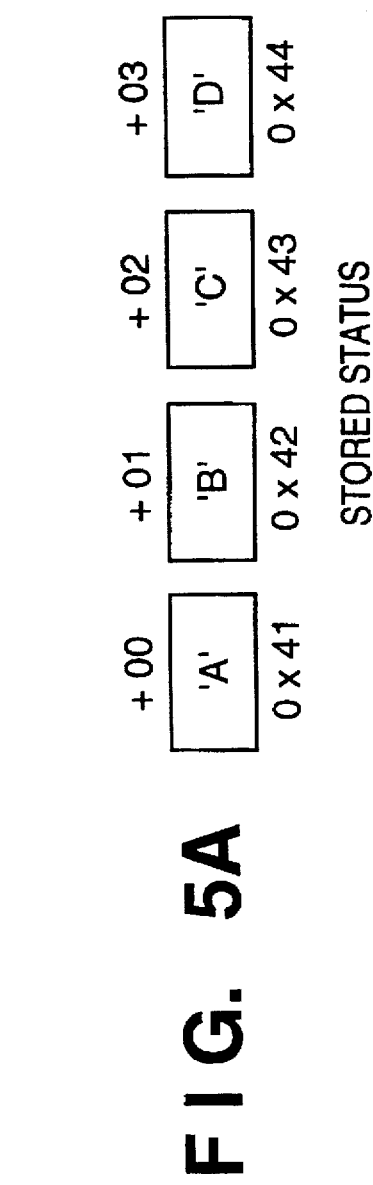
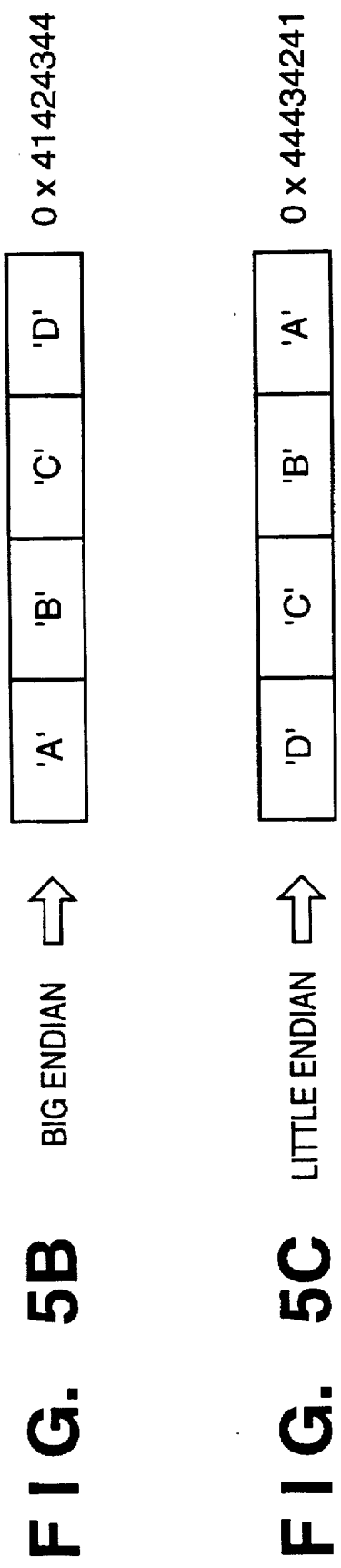
FIG. 5A
FIG. 5B
FIG. 5C

FIG. 6

○○○●○○●○
DRAWN STATUS

BIG ENDIAN ⇒  | MSB | | | | | | | LSB |  0 x 12
| 0 | 0 | 0 | 1 | 0 | 0 | 1 | 0 |

LITTLE ENDIAN ⇒ | MSB | | | | | | | LSB | 0 x 48
| 0 | 1 | 0 | 0 | 1 | 0 | 0 | 0 |

CHARACTER DATA PROCESSING METHOD AND APPARATUS

BACKGROUND OF THE INVENTION

This invention relates to a character data processing method and apparatus, and a character output apparatus, capable of outputting character patterns using font data, generated by different types of apparatuses, having different data structures.

Commonly-used font data includes basic font data and additional font data which can be registered by users as desired external characters. The first method for registering external character fonts is to design the character pattern by a user as a bitmap font and registering the generated bitmap font. The second method is registering an external character in the same format as that of the basic font data stored in a font memory, to use the external character font as a scalable font in a character-output device such as a printer or a display.

However, upon generating an external character as a bitmap font, if the order of data in the device that generated the bitmap font is different from that in a character-output apparatus main body, i.e., the endian of the device that generated the bitmap font and that of the character-output device that uses the generated external character font are different, the generated font cannot be registered into the character-output device. In this case, the font data must be regenerated in correspondence with the endian of the CPU of the character-output apparatus main body.

This problem also occurs in handling general font data, if the endian of a device that provides font data and that of a character-output apparatus are different.

In addition to the difference between endians, if data unit is limited in the character-output apparatus that uses font data, external characters cannot be registered.

SUMMARY OF THE INVENTION

Accordingly, the present invention has been made in view of the above conventional art and has its object to provide a character data processing method and apparatus, and a character output apparatus, capable of offsetting the difference between the data structure for a device where font data is generated and the data structure for a device where the generated font data is used, and registering the generated font data as effective font data.

According to the present invention, the foregoing object is attained by providing a character-data processing method for registering font data into a device which treats data having a predetermined word length, comprising: a judgment step of judging an endian corresponding to input font data; an endian conversion step of converting structure of the font data based on the result from judgment at the judgment step, in accordance with a predetermined rule; and a registration step of storing the font data converted at the endian conversion step.

Further, the foregoing object is attained by providing a character-data processing apparatus for registering font data in unit of a predetermined word length, comprising: judgment means for judging whether or not an endian of input font data corresponds with an endian of the character-data processing apparatus; endian conversion means for converting structure of the font data based on the result from judgment by the judgment means, in accordance with a predetermined rule; and registration means for storing the font data converted by the endian conversion means.

Further, the foregoing object is attained by providing a computer readable memory in which a program for registering font data into a computer which handles data of a predetermined word length, including; a judgment step code for judging an endian corresponding to input font data; an endian-conversion step code for converting structure of the font data based on the result from judgment at the judgment step, in accordance with a predetermined rule; and a registration step code for storing in a memory the font data converted at the endian conversion step.

In accordance with the present invention as described above, the character processing method and apparatus and a printing apparatus can offset the difference between the data structure for a device where font data is generated and the data structure for a device where the generated font data is used, and register the generated font data as effective font data.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5C are explanatory views showing different data structures in case of 4-byte access, based on different endians;

FIG. 6 is an explanatory view showing different data structures in drawing an image, based on different endians;

DETAILED DESCRIPTION OF THE PREFERRED EMBODIMENTS

Preferred embodiments of the present invention will now be described in detail in accordance with the accompanying drawings.

[First Embodiment]

Figure 1:
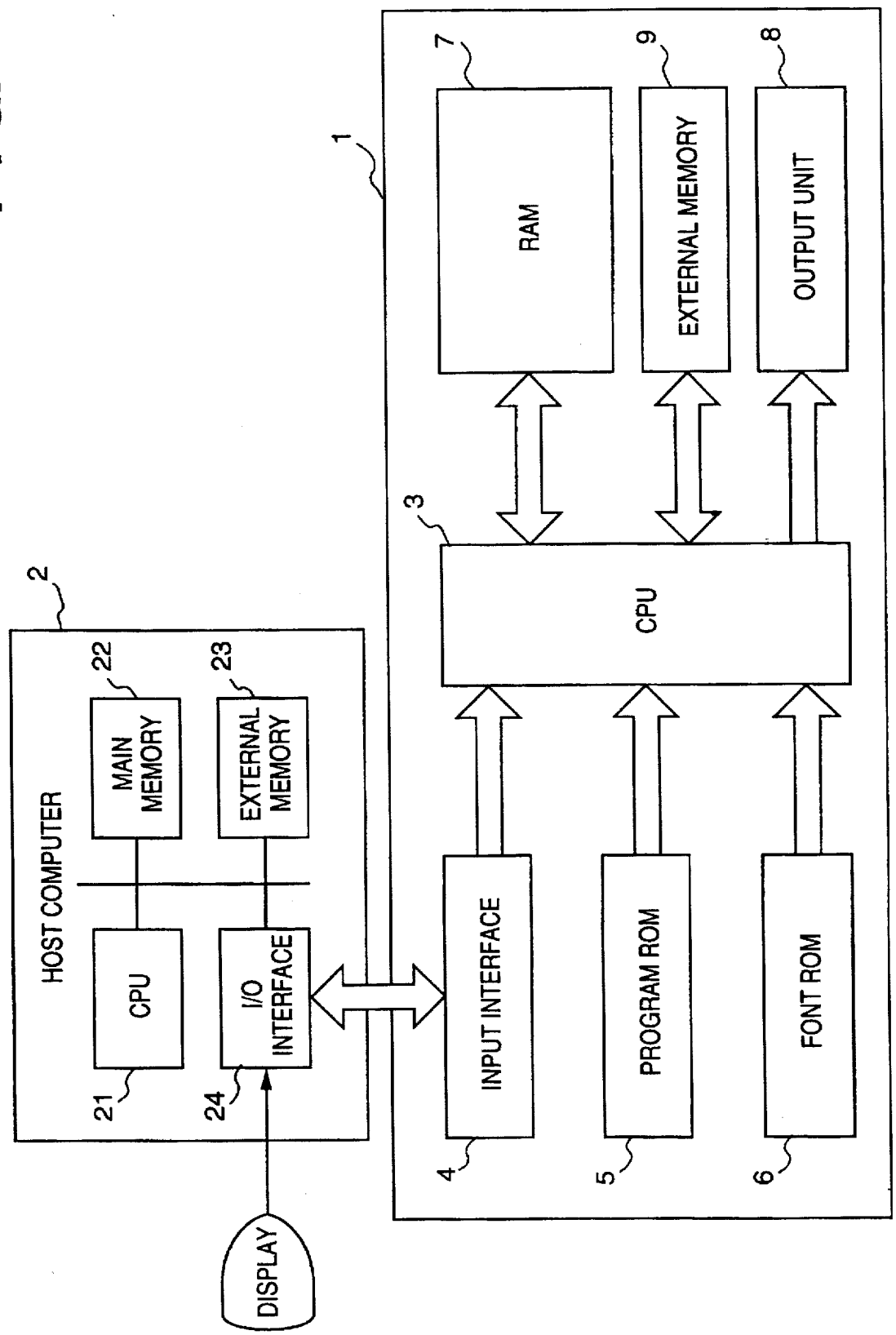
FIG. 1 is a block diagram showing the construction of a printer according to a first embodiment of the present invention.
Figure 3:
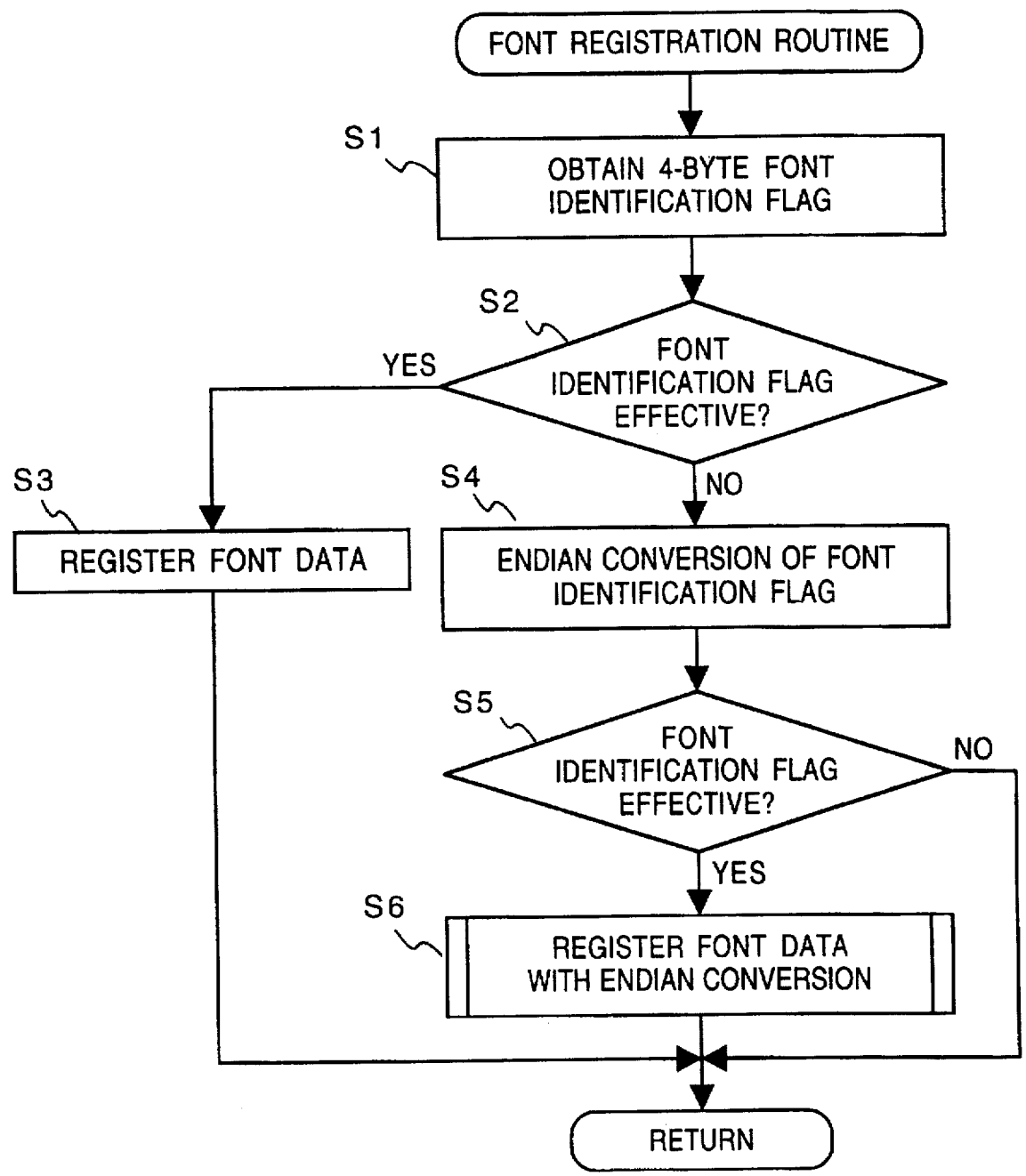
FIG. 3 is a flowchart showing font registration procedure considering conversion of endian stored in a program ROM.

FIG. 1 is a block diagram showing the construction of a printer according to a first embodiment of the present invention. In FIG. 1, a printer main body 1 receives print data from a host computer 2 as a data supply source. A CPU 3 controls the overall printer main body 1. In this embodiment, the CPU 3 handles data in 4-byte unit. That is, the word length for the CPU 3 is four bytes. Data sent from the host computer 2 is stored in an input interface 4. Control programs including a program shown in the flowchart of FIG. 3 are stored in a program ROM 5. Bitmap fonts and scalable fonts (character fonts stored as stroke information) are stored in a font ROM 6. A RAM 7 serves as a storage medium for the CPU 3. An output unit 8 comprises an ink-jet printer or a laser-beam printer for performing printing. If there is a large amount of data or data to be exchanged with external data, they are stored in an external memory 9.

The host computer 2 generates external character fonts and transmits the external character fonts to the printer 1.

A CPU 21 executes programs stored in a main memory 22, and controls the overall host computer 2.

The programs and data are stored in the main memory 22. An I/O interface 24 is provided to interface host computer 2 and peripheral devices. In FIG. 1, the I/O interface 24 is connected to the printer 1. An external memory 23 comprises a disk drive [or the like] for storing programs, font data and the like. If the external memory 23 is a removable storage medium such as a floppy disk drive or an MO disk drive, the programs and the font data can be supplied via the external memory 23 to the host computer 2.

Figure 2:
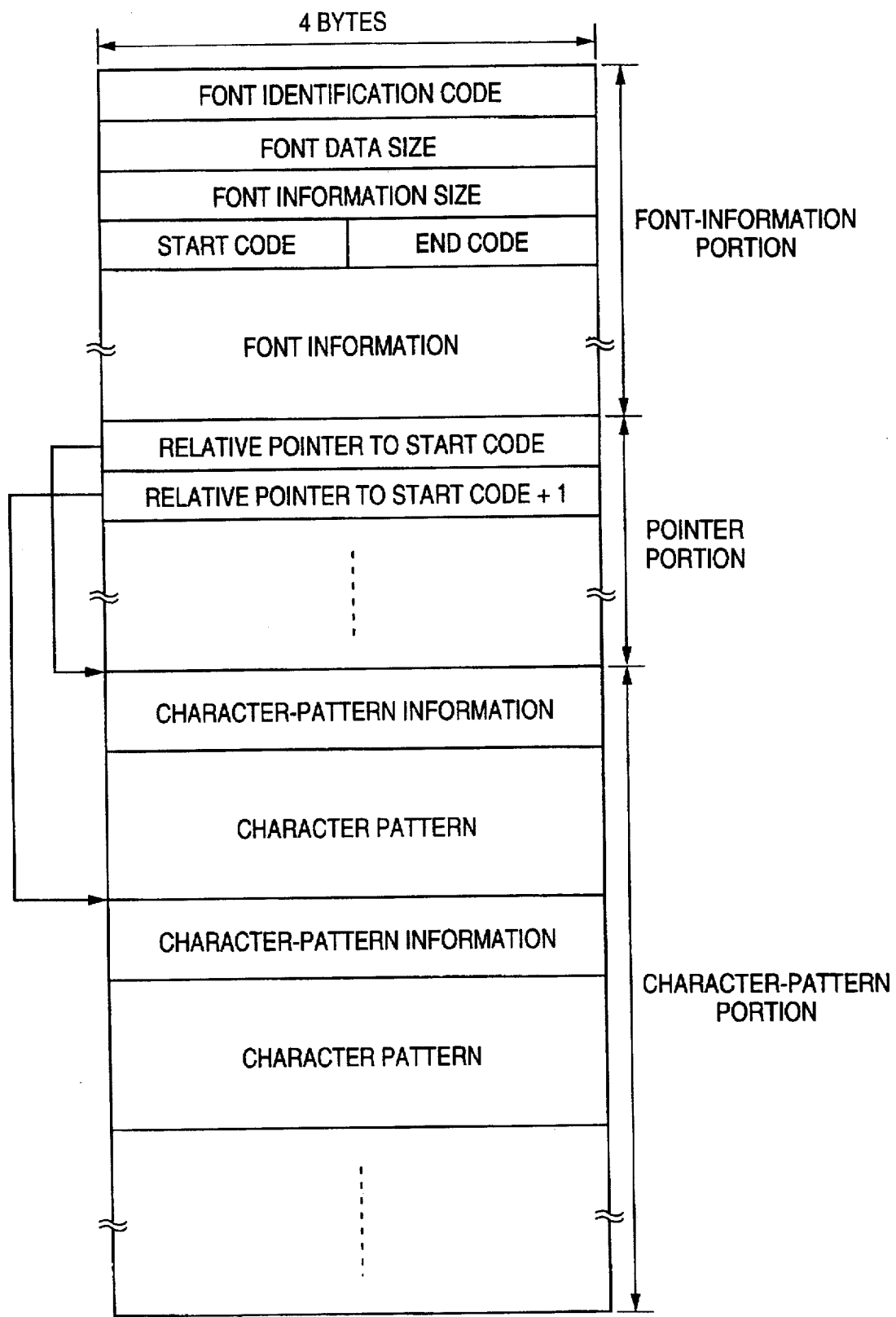
FIG. 2 is a diagram showing data format of font data in a font ROM.

FIG. 2 shows the data format of font data stored in the font ROM 6. The font data is briefly divided into font-information portion, a pointer portion and a character-pattern portion.

The font-information portion includes a font identification code for identifying the font, the size of the font-data, the size of the font-information portion, a start code, an end code, and font information indispensable to font output. The contents of the font-information portion are represented by 4-byte values, 2-byte values and 1-byte values.

The pointer portion is an address of a character pattern corresponding to a character code having the start code. This portion is described as a relative address from the head of the font data area.

The character-pattern portion is composed of character-pattern information and a character pattern, corresponding to the character pattern. The character-pattern information is necessary information for outputting the character code. The content of the character-pattern information includes a 2-byte values. If the character pattern is a scalable font, it contains 2-byte coordinates of stroke information, while if it a bitmap font, it contains bitmap information.

External character fonts are also generated by the host computer 2 in accordance with the same format. Note that the endian of the data format might be different from that of the data stored in the font ROM 6 of the printer 1.

FIG. 3 is a flowchart showing font registration procedure considering endian conversion, according to a control program stored in the program ROM 5.

When font-data registration in the same format as that of the data in the font ROM 6, i.e., the data format in FIG. 2, is instructed from the host computer 2, a dedicated font registration routine is read.

At step S1, the header 4-byte numerical value, the font identification code, is read from font data sent from the host computer 2. Next, at step S2, whether or not the font is registrable is checked.

For example, in a case where the font identification flag of registrable font is 0×41424344 ("ABCD"), if the font data has been generated on the premise of use in a BIG endian device, the font data is stored from the lowest address, "A" "B" "C" "D" on the memory of the input interface 4, as shown in FIG. 5A. If the CPU 3 of the printer main body 1 is also a BIG endian device, 4-byte reading from the input interface 4 results in 0×41424344 as shown in FIG. 5B, then the value read from the coincides with the font identification code, and the identification code is determined as effective. The received font data is registered at step S3.

Note that as the identification code of registrable font, the identification code stored in the font ROM 6 is used.

On the other hand, if the CPU 3 of the printer main body is a LITTLE endian device, and the data stored from the lowest address, "A" "B" "C" "D" on the memory is read, the head value is 0×44434241 as shown in FIG. 5C. As the value does not coincide with the registrable font identification code 0×41424344, the four byte value of the identification code value read at step S1 is changed at step S4, such that the first byte is exchanged with the fourth byte, and the second byte is exchanged with the third byte. Then the value is stored into the RAM 7. Note that in a case where 2-byte data is treated, the similar exchange is performed. In this case, the higher byte is exchanged with the lower byte. This byte exchange will be referred to as "endian conversion".

Next, at step S5, whether or not the endian-converted font identification flag is effective is checked. If YES, the font data is registered while performing the endian conversion at step S6. If NO, the registration is not performed, and the process ends.

Figure 4:
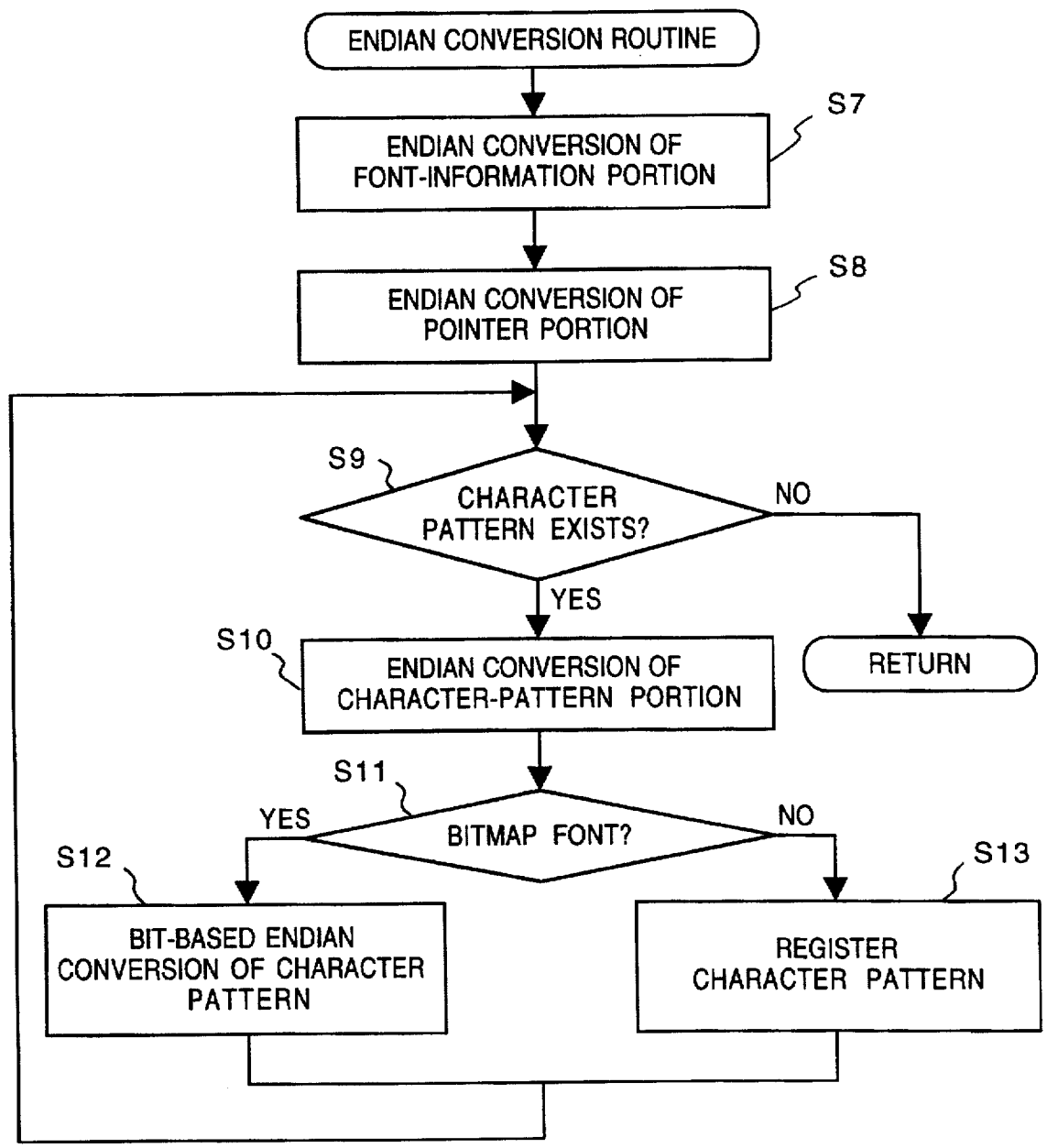
FIG. 4 is a flowchart showing a routine of the endian conversion.

FIG. 4 is a flowchart showing an endian conversion routine of the font registration program stored in the program ROM 5.

At step S7, endian conversion with respect to the font-information portion is performed in accordance with the format in FIG. 2. Since the font-information portion contains 4-bytes, 2-bytes and 1-byte value, registration into the RAM 7 of the printer main body 1 is made while performing byte-based endian conversion as described above.

Next, at step S8, endian conversion with respect to the pointer portion is performed. As the pointer portion contains all 4-bytes values, endian conversion is performed by four bytes with respect to all the pointers. That is, similar to the endian conversion of the font identification code, the first byte is exchanged with the fourth byte, and the second byte is exchanged with the third byte.

At step S9, whether or not a character pattern exists is checked. If YES, the process proceeds to step S10 at which endian conversion with respect to the character-pattern information portion is performed. As the character-pattern information portion has 4-byte, 2-byte and 1-byte values, similar to the font-information portion, the registration into the RAM 7 of the printer main body 1 is made while performing byte-based endian conversion similar to that of the font-information portion.

At step S11, whether or not the font data is indicative of a bitmap font is checked. If it is indicative of a bitmap font, the character pattern is registered into the RAM 7 while performing endian conversion in bit units. Specifically, in a case where a bit image is represented by a binary value, the least significant bit (LSB) of the value in the LITTLE endian corresponds to the most significant bit (MSB) of the value in the BIG endian, as shown in FIG. 6. Accordingly, the LSB side bits are exchanged with the MSB side bits. Hereinafter, this conversion will be referred to as "bit-based endian conversion".

If the font data is indicative of a scalable font or the like, the difference of endians can be offset in a procedure for developing the scalable font. In this case, the font data is registered into the RAM 7 of the printer main body 1 without conversion.

If NO at step S9, i.e., it is determined that a character pattern does not exist, the present routine ends.

As described above, even if the endian considered upon generating a character pattern in the host computer is different from that of the printer, the character pattern can be developed and registered as an effective font, by registering the external character font sent from the host computer in the printer while converting the endian in accordance with necessity.

Note that in this embodiment, the word length is four bytes, however, the present invention is not limited to this word length but applicable to any word length such as two bytes, eight bytes and the like.

[Second Embodiment]

The font data to be registered is divided into three portions, the font-information portion, the pointer portion and the character-pattern portion, as described above. These portions do not necessarily have sizes multiple of four bytes. However, some CPU can access four-byte group only for data having boundary head address (i.e., a multiple of the word length), or even if it can access 4-byte group for data without boundary head address, cannot do it in a short access period. Accordingly, if the head addresses of these three portions after registration are all boundary addresses, every CPU can access the portions.

Next, registration of font data while performing endian conversion according to the second embodiment will be described with reference to the flowchart of FIG. 7. Note that the font registration is identical to that of first embodiment as described in accordance with FIG. 3 except the endian conversion at step S6, therefore, the explanation of the other steps of the font registration will be omitted.

Figure 7:
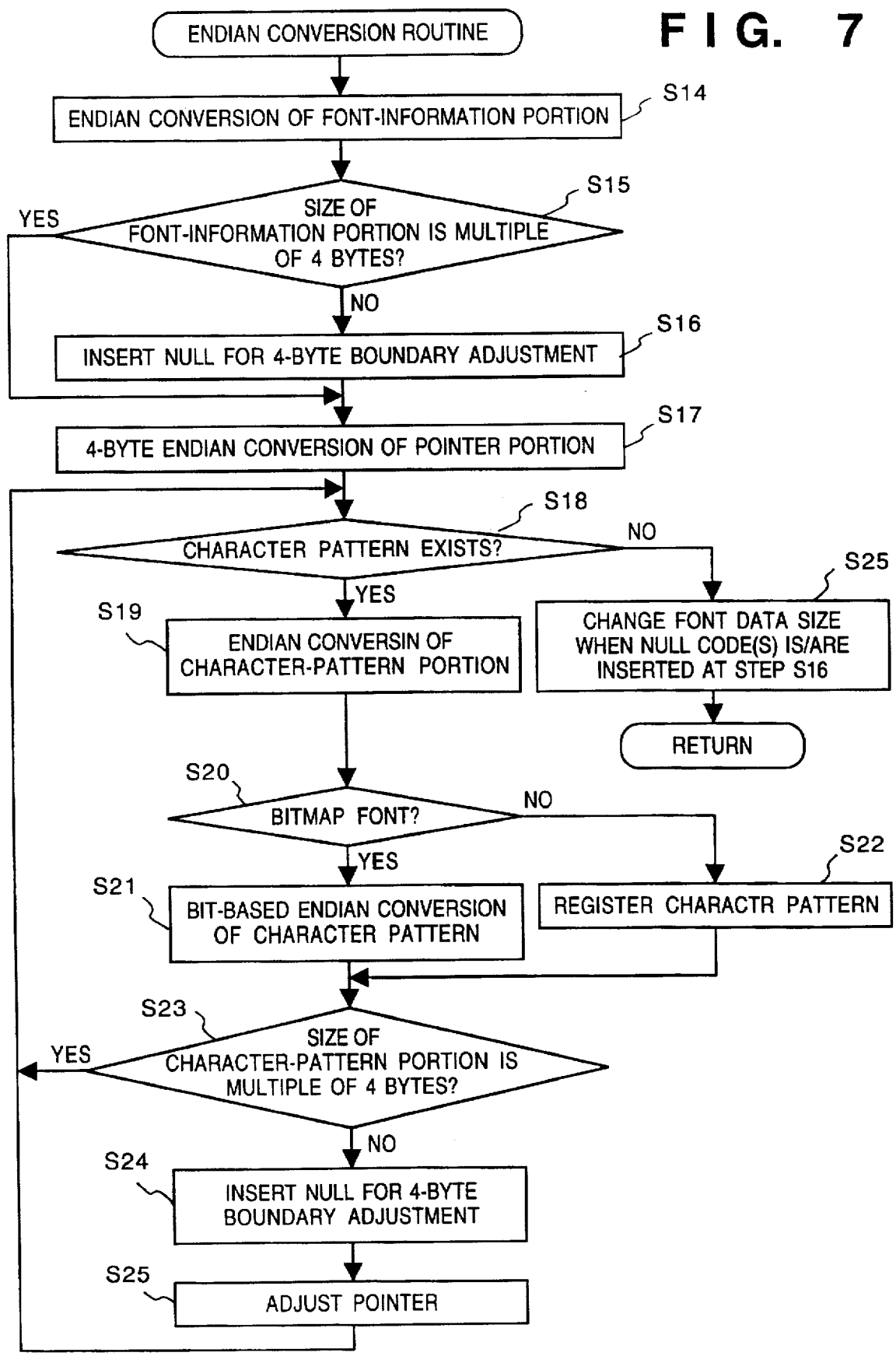
FIG. 7 is a flowchart showing a routine of the endian conversion considering boundary adjustment according to a second embodiment.

FIG. 7 shows the endian conversion with capability for adjusting the head address (boundary adjustment), according to a program stored in the program ROM 5.

First, at step S14, endian conversion of the font-information portion of a font data instructed to be registered, in accordance with the format of the font data. As the font-information portion has 4-byte, 2-byte and 1-byte values, the font data is registered into the RAM 7 of the printer main body 1 while performing byte-based endian conversion similar to that of the font identification code.

Next, at step S15, whether or not the size of the font information is a multiple of four bytes is checked. If NO, process proceeds to step S16 at which NULL (00) of the necessary number of bytes is inserted at the end of the of the font information, thus adjusting the bytes of the information to a multiple of four bytes. Thus, the following head address of the pointer portion becomes a 4-byte boundary address. If the size of the font-information portion is initially a multiple of four bytes, process proceeds to perform registration of the pointer portion without boundary adjustment.

Next, at step S17, endian conversion of the pointer portion is performed. As the pointer portion has all 4-byte numerical values, the pointer portion is registered into the RAM 7 of the printer main body 1 while performing 4-byte endian conversion with respect to all the pointers.

At step S18, whether or not a character pattern to be registered exists is checked. If YES, the process proceeds to step 19 to perform endian conversion of the character-pattern portion. Similar to the font-information portion, the character-pattern portion has 4-byte, 2-byte and 1-byte values, therefore, the character-pattern portion is registered into the RAM 7 of the printer main body 1 while performing byte-based endian conversion.

At step S20, whether or not the font data is indicative of a bitmap font is checked. If YES, the process proceeds to step S21 at which the character pattern is registered into the RAM 7 of the printer main body 1 while performing endian conversion.

If the font data is indicative of a scalable font or the like, as the difference of endians can be offset in a procedure for developing the scalable font. In this case, the process proceeds to step S22 at which the font data is registered into the RAM 7 of the printer main body 1 without conversion.

At step S23, whether or not the sizes of the character-pattern information and the character pattern in the character-pattern portion are multiples of four bytes is checked. If NO, the process proceeds to step S24 at which NULL (00) of a necessary number is inserted at the end of the of the character-pattern portion, thus adjusting the bytes of the information to a multiple of four bytes. If the size of the font-information portion is initially a multiple of four bytes, process proceeds to perform registration of the character-pattern portion without boundary adjustment.

At this time, the pointer to the boundary-adjusted character pattern is adjusted, if necessary.

If the numerical value of the character-pattern information has a maximum two byte length, the boundary adjustment is made based on two bytes.

At step S18, if the next character pattern does not exist, the process proceeds to step S25 at which the size information is changed for the NULL insertion, and the present routine ends.

The above construction according to the second embodiment enables the printer to use an external character font even if it is generated by a device having an endian different from that of the printer. Further, the embodiment enables the printer, if it cannot handle font data which does not have 4-byte boundary addresses, to use the font data by converting the data into 4-byte boundary data.

[Printer Mechanism]

Next, the mechanism of the output unit 8 which performs printing using fonts generated as described above will be described with reference to FIGS. 8 and 9.

Figure 8:
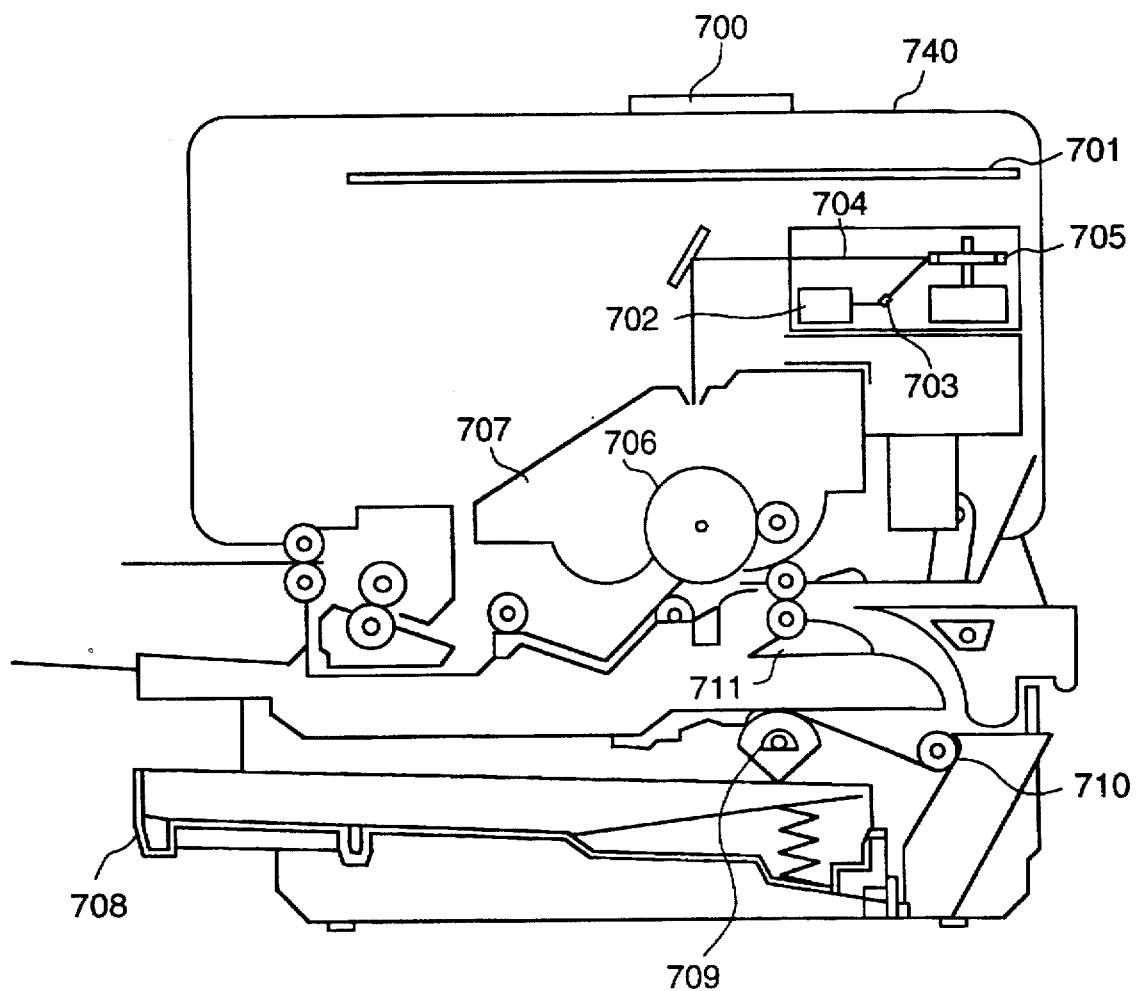
FIG. 8 is a cross-sectional view showing the structure of a laser-beam printer.

FIG. 8 is a cross-sectional view showing the structure of an laser-beam printer (LBP). The LBP printer inputs character-pattern data or the like as print data and performs printing on a print sheet.

In FIG. 8, numeral 740 denotes an LBP main body which forms an image on a print sheet as a recording medium based on supplied character-pattern data and the like; 700, an operation panel where switches and LED displays and the like for manual operation are provided; and 701, a printer control unit which controls the overall LBP 740 and interprets character-pattern information and the like. The printer control unit 701 mainly converts the character-pattern information into a video signal and outputs the signal to an laser driver 702.

The laser driver 702 drives a semiconductor laser 703 by on/off controlling a laser beam 704 emitted from the semiconductor laser 703. The laser beam 704 is swayed in a right and left directions by a rotating polygon mirror 705, and scan-exposes on an electrostatic drum 706. Thus, an electrostatic latent image is formed on the electrostatic drum 706. The latent image is developed by a development unit 707 around the electrostatic drum 706 and transferred onto the print sheet. The print sheet is a cut sheet contained in a paper cassette 708 attached to the LBP 740. The print sheet is conveyed into the LBP 740 and supplied to the electrostatic drum 706 by a paper-feed roller 709 and conveyance rollers 710 and 711.

Note that the present invention is not limited to the laser-beam printer, but it is also applicable to an ink-jet printer as described below.

Figure 9:
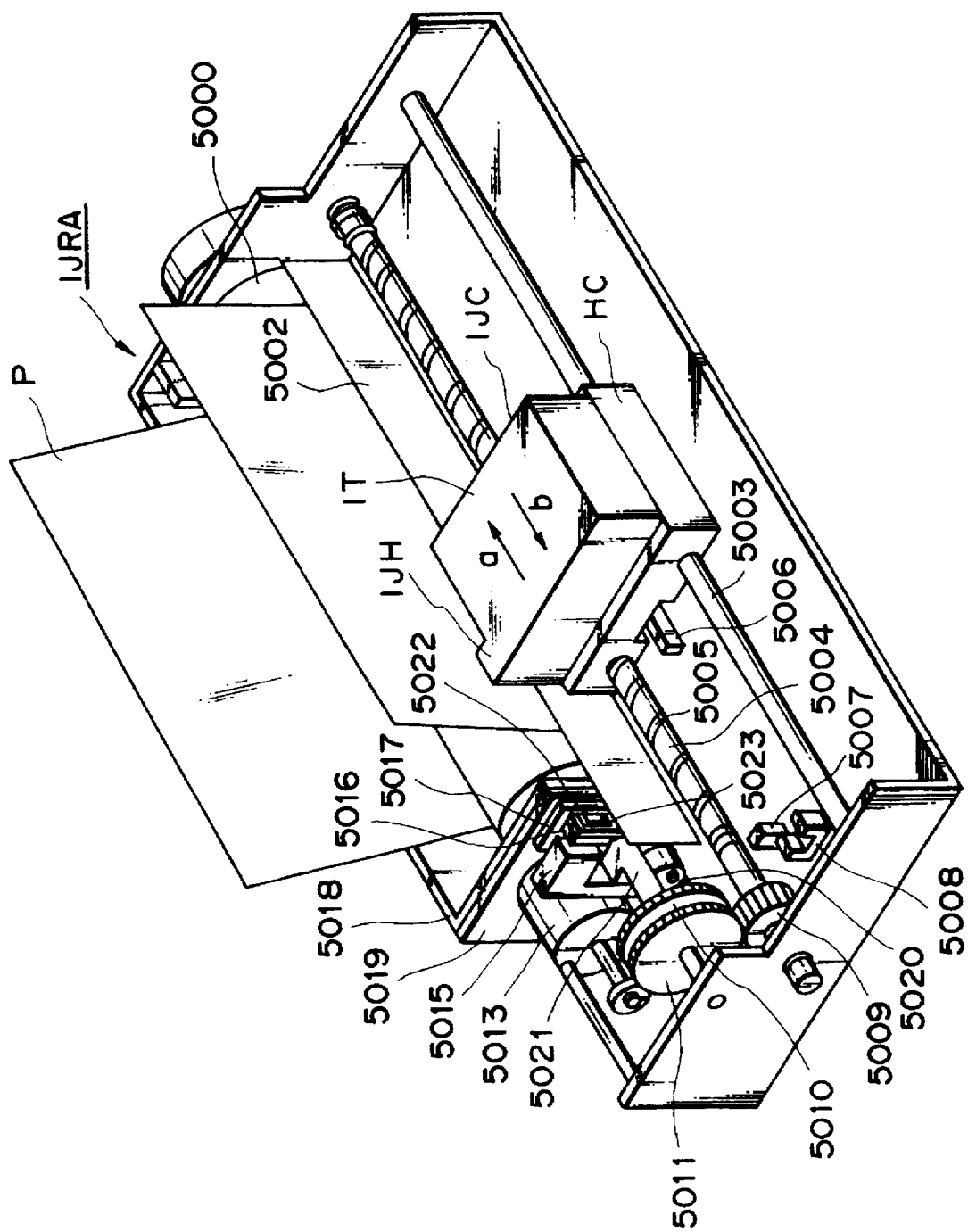
FIG. 9 is a perspective view showing an ink-jet printer.

FIG. 9 is a perspective view showing the structure of an ink-jet printer IJRA to which the present invention can be applied. In FIG. 9, a carriage HC is engaged with a spiral groove 5004 of a lead screw 5005 which rotates via drive force transmission gears 5009 to 5011 interlocking with forward/reverse rotation of a drive motor 5013. The carriage HC has a pin (not shown) and it is reciprocally moved in directions represented by arrows a and b. The carriage HC has an ink-jet cartridge IJC which integrally comprises a print head IJH and an ink tank IT. A paper holding plate 5002 presses a print sheet against a platen 5000 along the moving direction of the carriage HC. Photocouplers 5007 and 5008 are home position detecting members for confirming the existence of lever 5006 of the carriage in this area and changing over the rotational direction of motor 5013. A support member 5016 supports a cap member 5022 for capping the front surface of the print head IJH. A suction member 5015 performs suction-restoration of the print head the inside of the cap member 5022 via a cap inner opening 5023. Member 5019 allows a cleaning blade 5017 to move in a back-and-forth direction. A main body support plate 5018 supports the member 5019 and the cleaning blade 5017. It is apparent that any well-known cleaning blade is applicable to the printer of the embodiments. Numeral 5021 denotes a lever for starting the sucking operation of the suction-restoration. The lever 5021 moves along the movement of a cam 5020 engaged with the carriage HC. A well-known transmission mechanism such as change-over of a clutch controls a drive force from the drive motor.

When the carriage HC is at the home position area, a desired one of these capping, cleaning and suction-restoration is executed at its corresponding position by the lead screw 5005. The timing of any of these processings is not limited to the printer of the embodiments, if a desired processing is performed at a well-known timing.

The printer having the above mechanism performs print processing by using fonts registered as external characters.

[Other Embodiments]

The present invention can be applied to a system constituted by a plurality of devices (e.g., host computer, interface, reader, printer) or to an apparatus comprising a single device (e.g., copy machine, facsimile). For example, a host computer can use external-character fonts generated by another device for display or bitmapping.

Further, the object of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium used for an external memory 23 or external memory 9, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. A character-data processing method for registering font data into a device which treats data having a predetermined word length, comprising:

a judgment step of judging an endian corresponding to input font data;

an endian conversion step of converting structure of the font data based on the result from judgment at said judgment step, in accordance with a predetermined rule; and a registration step of storing the font data converted at said endian conversion step.

2. The character-data processing method according to claim 1, wherein said judgment step includes:

a decision step of deciding whether or not identification data included in the font data has a predetermined value;

a conversion step of, if it is decided at said decision step that the identification data does not have the predetermined value, converting the identification data by exchanging an upper byte with a lower byte of each word of the identification data; and a second decision step of deciding whether or not the identification data converted at said conversion step has the predetermined value, wherein at said endian conversion step, conversion of the structure of the font data is performed if it is decided at said second decision step that the identification data converted at said conversion step has the predetermined value.

3. The character-data processing method according to claim 1, wherein said endian conversion step includes:

a conversion step of exchanging an upper byte with a lower byte of each word of the font data;

a decision step of deciding whether or not the font data is indicative of a bitmap font; and a second conversion step of, if it is decided at said decision step that the font data is indicative of a bitmap font, exchanging an upper bit with a lower byte of each byte of the font data.

4. The character-data processing method according to claim 1, further comprising an adjustment step of adjusting the structure of the font data such that a part of data has a length multiple of a predetermined word length, prior to storing at said registration step.

5. The character-data processing method according to claim 3, wherein at said second conversion step, conversion is performed on character-pattern data included in the font data.

6. The character-data processing method according to claim 2, wherein if it is decided at said second decision step that the identification data converted at said conversion step does not have the predetermined value, the font data is not registered at said registration step.

7. The character-data processing method according to claim 2, if it is decided at said decision step that the identification data has the predetermined value, the font data is stored at said registration step without conversion at said endian conversion step.

8. A character-data processing apparatus for registering font data in unit of a predetermined word length, comprising:

judgment means for judging whether or not an endian of input font data corresponds with an endian of said character-data processing apparatus;

endian conversion means for converting structure of the font data based on the result from judgment by said judgment means, in accordance with a predetermined rule; and registration means for storing the font data converted by said endian conversion means.

9. The character-data processing apparatus according to claim 8, wherein said judgment means includes:

decision means for deciding whether or not identification data included in the font data has a predetermined value;

conversion means for, if said decision means decides that the identification data does not have the predetermined value, converting the identification data by exchanging an upper byte with a lower byte of each word of the identification data; and second decision means for deciding whether or not the identification data converted by said conversion means has the predetermined value, wherein said endian conversion means converts the structure of the font data if said second decision means decides that the identification data converted by said conversion means has the predetermined value.

10. The character-data processing apparatus according to claim 8, wherein said endian conversion means includes:

conversion means for exchanging an upper byte with a lower byte of each word of the font data;

decision means for deciding whether or not the font data is indicative of a bitmap font; and second conversion means for, if said decision means decides that the font data is indicative of a bitmap font, exchanging an upper bit with a lower bit of each byte of the font data.

11. The character-data processing apparatus according to claim 8, further comprising adjustment means for adjusting the structure of the font data such that a part of data has a length multiple of a predetermined word length, prior to storing by said registration means.

12. The character-data processing apparatus according to claim 10, wherein said second conversion means converts character-pattern data included in the font data.

13. The character-data processing apparatus according to claim 9, wherein if said second decision means decides that the identification data converted by said conversion means does not have the predetermined value, said registration means does not store the font data.

14. The character-data processing apparatus according to claim 9, if said decision means decides that the identification data has the predetermined value, said registration means stores the font data without conversion by said endian conversion means.

15. The character-data processing apparatus according to claim 9, further comprising font storage means in which font data is prestored, wherein said decision means uses identification data of the font data stored in said font storage means as the predetermined value.

16. The character-data processing apparatus according to claim 9, further comprising output means for outputting a character pattern based on the font data stored by said registration means.

17. The character-data processing apparatus according to claim 16, wherein said output means includes a printer.

18. The character-data processing apparatus according to claim 17, wherein the printer is an electrophotographic printer or an ink-jet printer.

19. The character-data processing apparatus according to claim 16, wherein said output means includes a display unit.

20. A computer readable memory in which a program for registering font data into a computer which handles data of a predetermined word length, including;

a judgment step code for judging an endian corresponding to input font data;

an endian-conversion step code for converting structure of the font data based on the result from judgment at said judgment step, in accordance with a predetermined rule; and a registration step code for storing in a memory the font data converted at said endian conversion step.

* * * * *

UNITED STATES PATENT AND TRADEMARK OFFICE
CERTIFICATE OF CORRECTION

PATENT NO. : 5,721,812
DATED : February 24, 1998
INVENTOR(S) : YASUSHI MOCHIZUKI It is certified that error appears in the above-identified patent and that said Letters Patent is hereby corrected as shown below:

Title page;
AT [56] ABSTRACT

Line 15, "offsetted." should read --offset.---.

COLUMN 1

Line 53, "endian conversion" should read --endian-conversion--;
    Line 57, "endian conversion" should read --endian-conversion--;
    Line 63, "endian conversion" should read --endian-conversion--; and
    Line 67, "endain conversion" should read --endain-conversion--.

COLUMN 2

Line 10, "endian conversion" should read --endian-conversion--.

Signed and Sealed this

Twenty-fifth Day of August, 1998

Attest:

BRUCE LEHMAN

Attesting Officer

Commissioner of Patents and Trademarks